3,705,080
METHOD FOR PRODUCING NICOTINAMIDE ADENINE DINUCLEOTIDE
Kiyoshi Nakayama, Sagamihara-shi, Japan, assignor to Kyowa Hakko Kogyo Co., Ltd., Tokyo, Japan
No Drawing. Continuation of application Ser. No. 658,316, Aug. 4, 1967. This application June 17, 1968, Ser. No. 737,314
Claims priority, application Japan, Aug. 8, 1966, 41/51,662
Int. Cl. C12d *13/06*
U.S. Cl. 195—28 N    12 Claims

ABSTRACT OF THE DISCLOSURE

A process for producing nicotinamide adenine dinucleotide which comprises culturing a microorganism capable of producing nicotinamide adenine dinucleotide in an aqueous nutrient medium under aerobic conditions in the presence of at least one surface active agent. As a result of the addition of the surface active agent to the medium, the nicotinamide adenine dinucleotide accumulates in the culture liquor extracellularly. Exemplary preferred surface active agents include cetyl trimethyl ammonium bromide and cetyl pyridinium chloride, but many others—cationic, anionic, non-ionic and amphoteric—may be used. The surface active agent may be added to the medium either at the beginning or sometimes during culturing, either all at one time or intermittently.

CROSS REFERENCE TO THE RELATED APPLICATION

This application is a continuation of copending application Ser. No. 658,316, filed on Aug. 4, 1967 and now abandoned.

The present invention relates to a process for producing nicotinamide adenine dinucleotide. More particularly, the invention relates to an improved process for producing nicotinamide adenine dinucleotide by fermentation with microorganisms.

Nicotinamide adenine dinucleotide can be found in yeasts, molds and bacteria. Accordingly, a process for producing nicotinamide adenine dinucleotide by extracting the raw material from microorganism cells and purifying the same is known in the prior art. Yet, this process has its disadvantages.

Nicotinamide adenine dinucleotide is a compound having an important role in biochemical reactions and is also useful in the alcoholic fermentation of glucose. Nicotinamide adenine dinucleotide, also known as coenzyme I, dehydrogenase coenzyme I, diphosphopyridine nucleotide and cozymase, has the following structural formula:

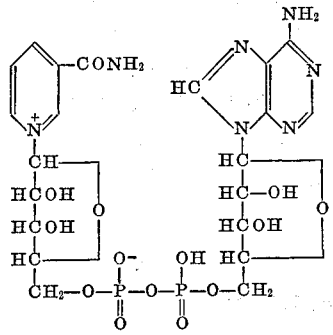

One of the objects of the present invention is to provide an improved process for the production of nicotinamide adenine dinucleotide which overcomes the disadvantages and deficiencies of the prior art methods.

Another object of the present invention is to provide a process for producing nicotinamide adenine dinucleotide be fermentation which may be carried out in an efficacious and simple manner.

A further object of the invention is to provide a process for producing nicotinamide adenine dinucleotide by fermentation which may be carried out advantageously on an industrial scale to give a high yield of product.

These and other objects and advantages of the present invention will become apparent to those skilled in the art from a consideration of the following specification and claims.

The present inventor has made various studies on processes for preparing nicotinamide adenine dinucleotide by utilizing microorganisms in a fermentation process. During culturing of these nicotinamide adenine dinucleotide-producing microorganisms, it has been found that the addition of surface active agents to the culture medium at any time during culturing remarkably increases the accumulation of nicotinamide adenine dinucleotide in the culture liquor. Accordingly, pursuant to the present invention, it has been found that adding surface active agents to culture media in which nicotinamide adenine dinucleotide-producing microorganisms are cultured is an effective step in obtaining a process which gives the product in high yield.

As noted above, a process for preparing nicotinamide adenine dinucleotide has been used which involves an extraction method from microorganisms and animal tissues. The only report in the prior art of the accumulation of nicotinamide adenine dinucleotide by the cultivation of microorganisms in a culture solution is that accomplished with a yeast, reported by Kitahara et al., in Japanese patent publication 29811/1964. It has been considered by workers in the field to be extremely difficult to accumulate nicotinamide adenine dinucleotide in culture solutions by cultivating microorganisms.

In the present invention, it has been found that the production and accumulation of nicotinamide adenine dinucleotide in a culture solution, regarded virtually as impossible up to now, can be generally and efficaciously achieved by cultivating after the addition of surface active agents to the culture medium. This finding is extremely advantageous as the extraction of nicotinamide adenine dinucleotide from bacterial cells requires the mechanical and chemical rupturing of cell walls, as well as treatments for denaturation and destruction. The loss of nicotinamide adenine dinucleotide in these processes is great and, in addition, a careful process control is also required for separation from the other bacterial cell components in the subsequent purification process. Accordingly, this prior art process is accompanied by many difficulties which are serious drawbacks to industrial practice.

The present invention overcomes these aforementioned difficulties. In the process of the present invention, nicotinamide adenine dinucleotide accumulates directly in the culture solution extra-cellularly. Furthermore, as shown in the examples hereinbelow, it is presumed that certain kinds of microorganisms secrete and produce extracellularly an intermediate necessary for the production of nicotinamide adenine dinucleotide from bacterial cells, i.e., 5-phosphoribosyl pyrophosphate, and enzymes by the addition of surface active agents to the culture medium.

Any of the microorganisms capable of producing nicotinamide adenine dinucleotide may be used in the process of the present invention. Thus, yeasts, bacteria, actinomycetes and molds generally may be used. Preferred microorganisms include yeasts belonging to the genera Saccharomyces, Candida, Torula, Schizosaccharomyces, Zygosaccharomyces, etc., and bacteria belonging to the genera Brevibacterium, Corynebacterium, Arthrobacter, Lactobacillus, Streptococcus, etc. These particular microorganisms are superior in producing large amounts of nicotinamide adenine dinucleotide.

The effects of the addition of surface active agents on the accumulation of nictotinamide adenine dinucleotide observed with various kinds of microorganisms are shown in Table 1 below. The experiments were run by adding cetyl trimethyl ammonium bromide (CTAB) to the culture medium twenty-four hours after the initiation of culturing, in amounts such that its concentration is 0, 0.01% and 0.1% by weight, respectively.

TABLE 1

| Microorganisms | Production of nicotinamide adenine dinucleotide | | |
|---|---|---|---|
| | Nothing added | CTAB 0.01% added | CTAB 0.1% added |
| Arthrobacter globiformis ATCC 8010 | ± | + | ++ |
| Bacillus cereus ATCC 7004 | ± | ++ | + |
| Brevibacterium ammoniagenes ATCC 6872 | ± | +++ | +++ |
| Brevibacterium ammoniagenes ATCC 6871 | ± | +++ | ++ |
| Brevibacterium helvolum ATCC 11822 | − | +++ | ++ |
| Brevibacterium imperiale ATCC 8365 | ± | ++ | ++ |
| Brevibacterium linens ATCC 9175 | − | ++ | ++ |
| Brevibacterium vitarumen ATCC 10234 | ± | ++ | ++ |
| Corynebacterium rathayi ATCC 13659 | ± | ++ | ++ |
| Corynebacterium tritici ATCC 11402 | ± | ++ | ++ |
| Micrococcus sodenensis ATCC 15932 | ± | ++ | ++ |
| Micrococcus varians ATCC 399 | − | + | + |
| Pseudomonas boreopolis ATCC 15452 | − | + | + |
| Proteus vulgaris ATCC 19181 | − | + | + |
| Serratia marcescens ATCC 19180 | ± | + | + |
| Sarcina lutea ATCC 15176 | ± | ++ | ++ |
| Streptococcus faecalis ATCC 11420 | ± | ++ | ++ |
| Candida utilis ATCC 16321 | ± | ++ | ++ |
| Saccharomyces cerevisiae ATCC 15248 | ± | + | + |
| Torula utilis ATCC 15239 | ± | ++ | ++ |
| Zygosaccharomyces major ATCC 15249 | ± | ++ | + |
| Candida tropicalis ATCC 15114 | ± | + | + |
| Penicillium chrysogenum ATCC 15241 | − | + | + |
| Streptomyces aureus ATCC 3309 | −− | + | + |
| Streptomyces flavovirens ATCC 3320 | − | + | + |

To the culture medium used in the present invention, surface active agents are added all at once or intermittently. They may be added either at the beginning of culturing or sometimes during the process of culturing.

Various substances can be used as the surface active agents. These include any of the suitable non-ionic, cationic, anionic or amphoteric surface active agents known in the art. Especially effective are the polyoxyethylene sorbitan fatty acid esters ($C_{12}$–$C_{18}$; Tween series), and the alkylamine salts thereof ($C_8$–$C_{18}$), the polyoxyethylene alkylamines ($C_{12}$–$C_{18}$; Nymeen series), the polyoxyethylene alkyl ethers ($C_{12}$–$C_{18}$), the polyoxyethylene alkyl allyl ethers ($C_8$–$C_{18}$), the alkyl trimethyl ammonium halides ($C_{12}$–$C_{18}$), the alkyl benzyl dimethyl ammonium halides ($C_{12}$–$C_{18}$), the alkyl pyridinium halides ($C_{12}$–$C_{18}$), the alkyl betaines ($C_{12}$–$C_{18}$) and the like. Specific surface active agents which may be employed include those known in the art such as cationic surface active agents, for example, cetyl trimethyl ammonium bromide (CTAB), cetyl pyridinium chloride (CPC), Nissan, Cation AB (trimethyloctadecylammonium chloride), Cation $F_2$–50 (alkyl dimethylbenzyl ammonium chloride). Acetamine 24 (alkylamine acetate), Nymeen S–215 (polyoxyethylene stearylamine), Megamine (product of Meggitt Ltd. Australia, certain imidazoline compound), Cation SA (octadecylamine acetate), polyoxyethylene stearyl amines, etc., anionic surface active agents, for example, sodium lauryl sulfate (SLS), sodium oleyl amide sulfate (SOAS), etc., non-ionic surface active agents, for example, Tween 60 (polyoxyethylene sorbitan monostearate) and Tween 40 (polyoxyethylene sorbitan monolaurate), as well as amphoteric surface active agents, as noted above.

The amounts of surface active agent to be added to the culture medium vary more or less depending upon the particular type of surface active agent, the time of addition and the particular microorganism used. However, concentrations ranging from about 0.01% to about 0.5% by weight are generally preferred.

The fermentation medium comprises either a synthetic culture medium or a natural nutrient medium which contains the essential nutrients for the growth of the microorganism strain employed. Such fermentation medium generally contains a carbon source, such as carbohydrates, a nitrogen source, inorganic compounds and the like which are utilized by the microorganism employed in specific amounts.

The carbohydrates include, for example, glucose, fructose, maltose, sucrose, starch, starch hydrolysate, molasses and the like. Small amounts of other suitable carbon acids, etc., may be used in the fermentation medium along with the carbohydrates. The carbohydrates may be used either singly or in mixtures of two or more and any small amount of other carbon sources may also be present either singly or in mixtures of two or more.

The inorganic compounds include such materials as potassium phosphate, magnesium sulfate, iron sulfate or other iron salts, potassium chloride, magnesium chloride, calcium chloride, etc. As a nitrogen source, various kinds of inorganic or organic salts or compounds, such as urea or ammonium salts such as ammonium chloride, ammonium sulfate, amonium nitrate, amonium phosphate, etc., or one or more than one amino acid mixed in combination, or natural substances containing nitrogen, such as cornsteep liquor, yeast extract, meat extract, fish meal, peptone, bouillon, casein hydrolysates, fish solubles, rice bran extract, etc. may be employed. These substances may also be used either singly or in combinations of two or more. It may be also necessary to add certain essential nutrients to the culture medium, depending upon the particular microorganism employed, such as amino acids, for example, aspartic acid, threonine, methionine, etc., and/or vitamins, for example, biotin, thiamine, cobalamin and the like.

Fermentation is conducted under aerobic conditions, such as aerobic shaking of the culture or with stirring of a submerged culture. Incubation temperatures of about 20° to 40° C. and a pH of about 5 to 9 are preferable. Other temperature and pH conditions may also be used. Remarkably large amounts of nicotinamide adenine dinucleotide are found to be accumulated in the fermentation liquor.

After the completion of the fermentation, the nicotinamide adenine dinucleotide may be separated from the culture liquor by conventional means, such as ion exchange resin treatment, precipitation with metallic salts, extraction methods, conventional adsorption methods, chromatography and the like.

The following examples are given merely as illustrative of the present invention and are not to be considered as limiting. Unless otherwise noted, the percentages in the application and in the examples are by weight.

Example 1

Corynebacterium sp. No. 3485 ATCC 210804 is used as the seed bacterium. It is cultured at 30° C. for 24 hours in a culture medium having a composition consisting of 2% of glucose, 1% of peptone, 1% of yeast extract, 0.3% of NaCl and 30 µg./l. of biotin. The seed culture is then transplanted in a ratio of 10% by volume to a fermentation culture medium having the following composition (per liter of water):

100 g. glucose
6 g. urea
1.0% $K_2HPO_4$
1.0% $KH_2PO_4$
1.0% $MgSO_4 \cdot 7H_2O$
1.0% bouillon
30 µg. biotin The urea is separately sterilized as a 12% solution. Nineteen ml. portions of an aqueous solution containing the other fermentation medium components are individually poured into flasks. These flasks are sterilized in an autoclave for 10 minutes at 1 kg./cm.$^2$ Then, 1 ml. of the sterilized urea solution is added to each of the flasks before the transplantation of the seed culture.

The combination of seed and fermentation media is poured in 20 ml. portions into conical flasks having a capacity of 250 ml. each.

Culturing is then carried out with aerobic shaking at 30° C. After 24 hours of culturing a cationic surface active agent, Nymeen S–215 (polyoxyethylene alkylamine), is added to the fermentation medium in a concentration of 1 mg./ml. Adenine and nicotinamide are added to the medium in a concentration of 2 mg./ml., respectively. Culturing is then carried out subsequently for another 96 hours. As a result, 5.30 mg./ml. of nicotinamide adenine dinucleotide is found to be produced and accumulated in the culture liquor.

A control experiment is carried out with the same media and under the same conditions as that described above, except that Nymeen S–215 is not added to the medium. The amount of nicotinamide adenine dinucleotide produced is 0.8 mg./ml.

The nicotinamide adenine dinucleotide is recovered by an ion exchange treatment.

Example 2

Culturing is carried out wtih the same media and under the same conditions as described in Example 1, except that *Brevibacterium ammoniagenes* ATCC 6872 is used as the seed microorganism and Megamine (an imidazoline compound) is employed as the additive surface active agent. The amount of nicotinamide adenine dinucleotide produced as a result of this process is 5.20 mg./ml.

The amount of nicotinamide adenine dinucleotide produced in a culture medium in a control experiment carried out with the same media and under the same conditions, except that Megamine is not added to the medium, is 0.7 mg./ml.

Example 3

The same culturing process as that described in Example 1 is carried out, except that Arthrobacter sp. No. 3486 ATCC 21085 is used as the microorganism and cetyl trimethyl ammonium bromide is employed as the additive surface active agent at a concentration of 1 mg./ml. The amount of nicotinamide adenine dinucleotide produced in the culture liquor is 4.7 mg./ml.

A control culture is carried out under the same conditions, but without the addition of cetyl trimethyl ammonium bromide. The amount of nicotinamide adenine dinucleotide obtained thereby is only 0.7 mg./ml.

The invention being thus described, it will be obvious that the same may be varied in many ways. Such variations are not to be regarded as a departure from the spirit and scope of the invention, and all such modifications as would be obvious to one skilled in the art are intended to be included herein.

I claim:
1. A process for producing nicotinamide adenine dinucleotide which comprises culturing a nicotinamide adenine dinucleotide-producing microorganism belonging to a genus selected from the group consisting of Arthrobacter, Bacillus, Brevibacterium, Corynebacterium, Micrococcus, Pseudomonas, Proteus, Serratia, Sarcina, Streptococcus, Candida, Saccharomyces, Torula, Zygosaccharomyces, Penicillium and Streptomyces in an aqueous nutrient medium under aerobic conditions in the presence of at least one non-ionic, cationic, anionic or amphoteric surface active agent, accumulating nicotinamide adenine dinucleotide in the resulting culture liquor and isolating the nictotinamide adenine dinucleotide therefrom.

2. The process of claim 1, wherein said surface active agent is added to the medium at the initiation of culturing.

3. The process of claim 1, wherein said surface active agent is added to the medium after the initiation of culturing.

4. The process of claim 1, wherein said surface active agent is selected from the group consisting of polyoxyethylene sorbitan fatty acid esters of 12 to 18 carbon atoms, alkylamine salts of 8 to 18 carbon atoms, polyoxyethylene alkylamines of 12 to 18 carbon atoms, polyoxyethylene alkyl ethers of 12 to 18 carbon atoms, polyoxyethylene alkyl allyl ethers of 8 to 18 carbon atoms, alkyl trimethyl ammonium halides of 12 to 18 carbon atoms, alkyl benzyl dimethyl ammonium halides of 12 to 18 carbon atoms, alkyl pyridinium halides of 12 to 18 carbon atoms, alkyl betaines of 12 to 18 carbon atoms, higher fatty acid esters and higher fatty acid amides.

5. The process of claim 7, wherein said culturing is carried out at a temperature of about 20° to 40° C. and at a pH of about 5 to 9.

6. The process of claim 5, wherein said surface active agent is employed in an amount of about 0.01 to 0.5% by weight.

7. The process of claim 6, wherein said microorganism is a yeast belonging to a genus selected from the group consisting of Saccharomyces, Candida, Torula, Schizosaccharomyces and Zygosaccharomyces.

8. The process of claim 6, wherein said microorganisms is a bacterium belonging to a genus selected from the group consisting of Brevibacterium, Corynebacterium, Arthrobacter, Lactobacillus and Streptococcus.

9. The process of claim 6, wherein the nicotinamide adenine dinucleotide is isolated from the culture liquor by an ion exchange resin treatment.

10. The process of claim 5, wherein said microorganism is Corynebacterium sp. ATCC 21084.

11. The process of claim 5, wherein said microorganism is *Brevibacterium ammoniagenes* ATCC 6872.

12. The process of claim 5, wherein said microorganism is Arthrobacter sp. ATCC 21085.

References Cited
UNITED STATES PATENTS
3,359,177  12/1967  Nara et al. _____ 195—28 N ALVIN E. TANENHOLTZ, Primary Examiner U.S. Cl. X.R.
195—114